Dec. 2, 1941.                J. S. LOSEE                2,264,445
                        MILK TESTING APPARATUS
                      Filed Oct. 17, 1938          3 Sheets-Sheet 1
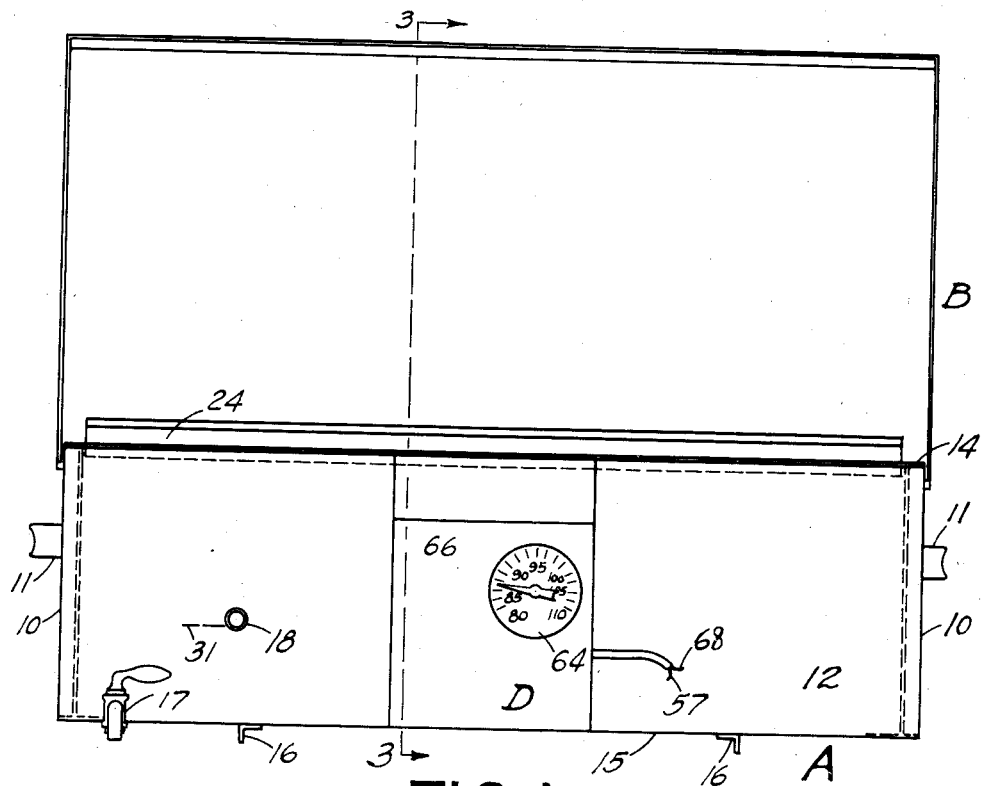
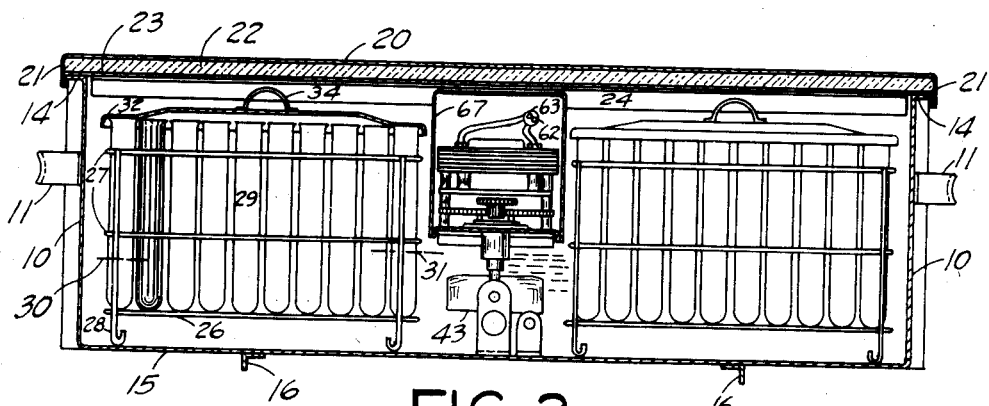
INVENTOR
JOSEPH S. LOSEE
BY A. S. Knob
ATTORNEY Dec. 2, 1941.  J. S. LOSEE  2,264,445
MILK TESTING APPARATUS
Filed Oct. 17, 1938  3 Sheets-Sheet 2
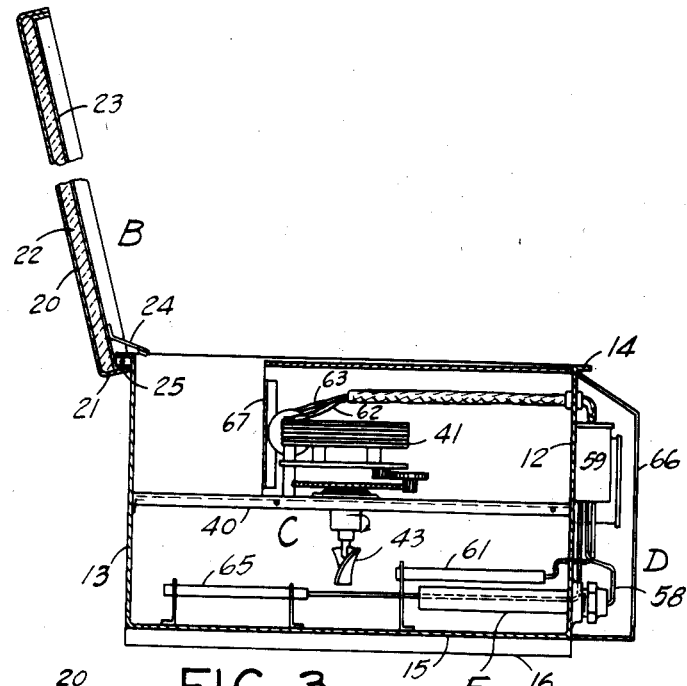
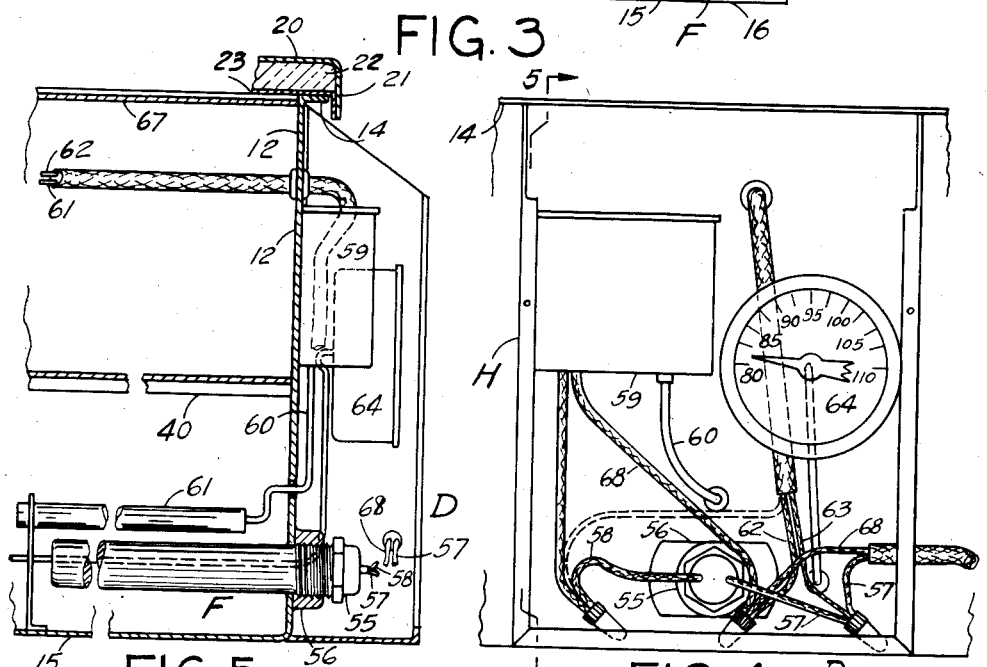
INVENTOR
JOSEPH S. LOSEE
BY A.S.Kroh
ATTORNEY Dec. 2, 1941.   J. S. LOSEE   2,264,445
MILK TESTING APPARATUS
Filed Oct. 17, 1938   3 Sheets-Sheet 3

INVENTOR
JOSEPH S. LOSEE
BY A. S. Hirsch
ATTORNEY

Patented Dec. 2, 1941

2,264,445

UNITED STATES PATENT OFFICE 2,264,445

MILK TESTING APPARATUS

Joseph S. Losee, Hebron, Ill., assignor to Losee Products Co., a corporation of Illinois Application October 17, 1938, Serial No. 235,463

5 Claims. (Cl. 23—258)

The present invention refers to means for testing milk at the receiving depots or otherwise and has for its object, definitely indicating in a simple and inexpensive manner the bacteria count in the milk tested.

Sanitary conditions on dairy farms and at milk depots have, in late years, received the serious attention of the authorities because it has been found to be difficult to continuously prevent the presence of a harmful bacteria count and therefore the present invention was evolved for the principal purpose of positively determining the bacteria count in milk upon its arrival at the depot so the cause may be immediately remedied.

It is frequently difficult to discover the presence of unsanitary conditions on a farm or the cause of milk contamination. It frequently happens that such conditions may readily be eliminated once the increase in bacteria is known.

The present invention provides means whereby a small sample of each delivery made may be easily tested with definite results. Thus the dairy may be warned about the increased bacteria count and seek out and eliminate the conditions which caused the increase. A peculiar and serious aspect of the situation is that milk from a dairy farm varies considerably from one week to another and even from one day to another and for that reason every delivery of milk should be accurately tested.

An object of the present invention is to provide means whereby the samples may be quickly, accurately and cheaply tested by the ordinary laborer employed at receiving depots.

A further object of the present invention is to provide a device which can be manufactured at low cost and which will be practically indestructible.

To these and other useful ends my invention consists of parts, combinations of parts or their equivalents, and mode of operation, as hereinafter described and claimed and shown in the accompanying drawings in which:

Fig. 1 is a front elevation of my improved device having the lid lifted or in a position for removing or replacing the trays.

Fig. 2 is a sectional view of the device taken on line 2—2 of Figure 6.

Fig. 3 is a section of the device taken on line 3—3 of Figure 1.

Fig. 4 is a front elevation of the control box having the lid removed.

Fig. 5 is a fractional section of the device taken on line 5—5 of Figure 4.

Figure 6:
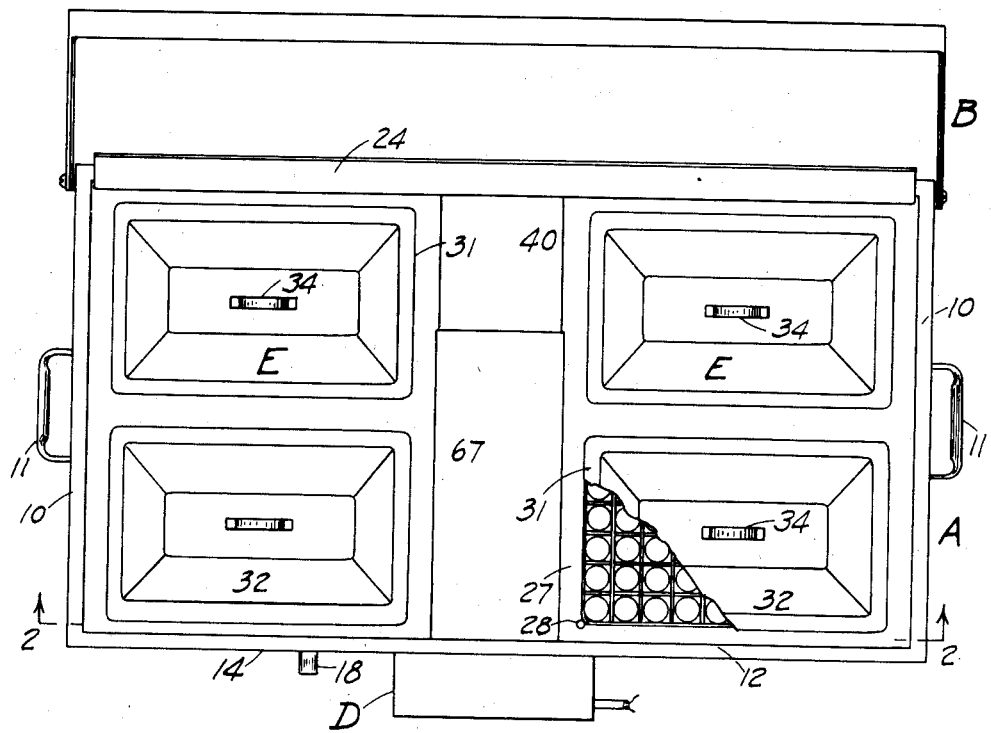
Fig. 6 is a top view of the device as shown in Figure 1.

As thus illustrated, the container or tank of the device is designated in its entirety by reference character A and the lid is designated by reference character B. The motor and water circulating means attached thereto are designated in their entirety by reference character C and the control box in its entirety is designated by reference character D.

Member A comprises end panels 10—10 each having secured thereto carrying handles 11—11. The front panel is designated by reference numeral 12 and the rear panel by numeral 13. Each panel at its top is provided with an outwardly extending flange 14. The bottom panel of member A is designated by reference character 15.

I supply supporting pieces 16, these pieces being spaced as illustrated in Figures 1 and 2 and extending entirely across the bottom of member A as illustrated in Figure 3 thus to stiffen member 15 and act as a suitable supporting means for member A.

I provide a drain cock 17 in the bottom of member A and an overflow 18 thus to limit the water level in member A. Lid B comprises a top panel 20 having downwardly extending flanges 21 on the four sides thereof and being provided with an insulating sheet 22 and a retaining sheet 23. Lid B is also provided with a drip shield 24 thus if there is any moisture on member 23 when the lid is lifted, it will be caused to drain back into member A instead of passing down around the outside of flange 14 and perhaps into hinge 25 by means of which the lid B is mounted on member A.

A further reason for supplying member 24 is to prevent drippings from striking the outside of member A as it will be noticed that flange 21 acts as a limit stop to the lid by contacting member 13 and therefore accumulation of moisture above flange 21 would finally escape down the outside surface of member 13 and perhaps reach the table on which the device is supported.

It will be noted by scrutinizing Figure 2 that member 23 is also preferably provided with a downwardly extending flange which fits snugly against the lid flange 21 and that this member 23 will lie snugly on flange 14 thus to practically seal the interior of member A from the exterior when the lid is closed.

One of the objects of insulating material 22 is that since the water in member A is heated to say 97° by means which will hereinafter appear, considerable moisture will accumulate on the bottom of the lid if it were not provided with insulating material, the object therefore being to prevent, as near as possible, the accumulation of moisture under the lid.

I provide containers each adapted to hold a large number of test tubes. In the design as shown in the figures, I provide four of these containers each in its entirety being designated by reference character E comprising a bottom wire screen 26, a central and top wire grate 27—27 being secured in spaced relation to corner posts 28, the posts being extended downwardly a short distance so as to hold member 26 away from the bottom of member A.

Members 27 are formed from straight spaced pieces of wire longitudinal and transverse to the container and positioned so as to provide room for test tubes 29. In the container illustrated, there is provided room for six rows of test tubes having 10 tubes in each row thus there is room in each container for 60 test tubes and in the entire device for 240 tubes or tubes enough to test 240 different samples of milk.

Thus as the milk is received, small quantities are taken from each and placed in a test tube to which is also added a suitable quantity of chemical for making what is called a blue-test. The charged tubes are placed in the containers which are temporarily placed in iced water until the operator is ready to make the test.

It will be assumed that the milk and chemical will fill the test tube to line 30 (see Figure 2). Enough water is supplied to member A to reach line 31, thus the top of the milk being tested will be somewhat below the water line which is limited to this height by overflow tube 18.

While making the test it is very necessary to protect against foreign matter reaching the milk in the test tubes. I therefore provide a stainless steel cover 32 having a downwardly extending lip 33 and a handle 34 the practice being to fill the test tubes and place them in the container before the lid is placed over the top of the tubes and then the container is placed in unit A. Thus for example, if it is necessary to remove one of the rear containers, the drippings from the container as it is moved over the top of unit A cannot reach the test tubes and any foreign matter that might fall into member A while the lid is lifted will therefore be kept from reaching the tubes.

Unit C is supported on a transverse channel 40 and comprises suitable electric motor 41 having a number of reducing gears which terminate preferably in a gear 42 which will be caused to turn at a suitable speed for circulating the water through member A by means of a paddle 43 which is suitably secured to shaft 44, the shaft having a flange 45 at its upper end and being driven by pins 46 which are secured to gear 42, the pins being loosely embraced by openings in the flange.

It will be seen that shaft 44 will be driven by the motor but will be flexibly and operatively connected thereto. Flange 45 is adapted to rest on the end of bearing sleeve 47. In order to properly lubricate shaft 44, a well is formed by means of a circular ring 48.

I cut a narrow slot 49 in the top edge of member 47 and place an annular felt washer 50 in the space between members 47 and 48 thus when this washer is once lubricated, a certain amount of oil will reach the shaft and the surface between members 45 and 47.

Figures 7, 8:
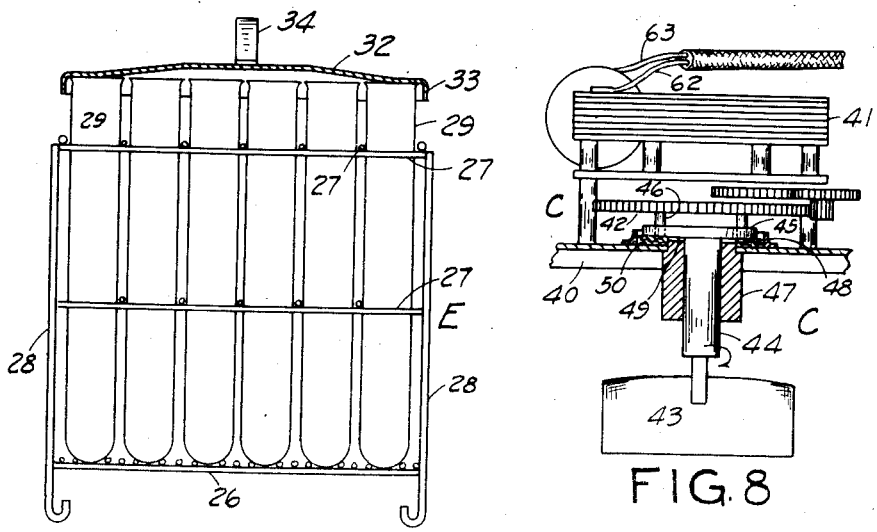
Fig. 7 is an end elevation of one of the tube holding cages illustrating the cover in section.
Fig. 8 is a side elevation of the motor and water propeller.

Member 43 at its ends is given a slight rearward curve and a slight twist as illustrated in Figures 2, 3 and 8. The twist may be varied according to the size of member A, however I have found that by positioning and shaping member 43 as illustrated in the various figures, the water will be caused to circulate downwardly, outwardly and then upwardly at the walls of member A, then inwardly and downwardly to the propeller, the object being to move all of the water which surrounds the test tubes so each tube will be held at the same temperature.

In tests of this nature with my device it has been found necessary to circulate the water as described. Clearly it is possible to maintain an equal temperature within ½ of 1 degree Fahrenheit around each of the widely scattered test tubes.

The means for automatically maintaining the desired water temperature in the device are as follows: A heating element which in its entirety is designated by reference character F is provided, having a moisture sealed resister therein and being provided with a head 55 which is preferably screw threaded into a flange fitting 56 having wires 57 and 58 one leading to a thermally controlled switch 59, this switch having a connection 60 to a thermal element 61.

The thermal element is adapted to cause the switch to open when the temperature of the water is above the desired point and to close the switch when the temperature is below the desired point thus to turn the heating element on and off so as to maintain the desired temperature of the water in member A. Switch 59 is connected to the source of electrical supply by means of a wire 68. Wire 58 leads from the switch to element F which in turn is connected to the source of electrical supply by means of wire 57. Wires 68 and 57 are connected to motor C by means of wires 62 and 63. Thus at intervals, necessary heat is supplied to the water and the motor C will cause blade 43 to continuously circulate the water so as to maintain an even temperature throughout the device. I may elect to connect motor C in multiple with heating element F as illustrated by dotted lines in Figure 4 whereby the motor will operate simultaneously with element F; or motor C and element F may be designed for a series connection.

I provide a temperature indicator 64 having a connection to a thermal element 65. Member D comprises the projecting frame and a removably secured lid 66, the side walls of the frame being tapered at their top and member 66 being adapted to extend over and form a roof for member D so as to prevent any moisture from reaching the instruments within this member.

I provide a removable lid 67 for motor C which may be secured to the flanges of member 40 thus to protect the motor against the possibility of drippings from the containers as they are removed and replaced or drippings that might accumulate on lid B. Thus it will be seen that by removing this lid, the motor will be in full view of the operator but when the lid is in place, the motor will be protected against dust and moisture.

An opening in the front of member 66 is provided, whereby the temperature indicator may be observed without removing the lid.

As thus illustrated, it will be seen that I have provided a very efficient tank and lid therefor;

efficient means for holding the test tubes and protecting the milk and efficient means for circulating the heated water and maintaining a fixed temperature therefor.

Thus when a certain number of test tubes have been charged and placed in the containers and the containers placed in member A, the water having already been heated by means of the heating element, the milk will soon reach a temperature of 98.6 degrees or whatever temperature is found to be the most desirable and the milk having already been mixed with the proper quantity of methylene blue the bacteria count may easily be determined by the time element required to change the color of the milk as provided in the well known reductase test.

In making the reductase test, milk that turns white within 4 hours is considered as having an objectionable bacteria count. Thus it will be seen that with little effort on the part of the operator, definite information is available as to whether the milk is suitable for human consumption or not.

Each of the test tubes are preferably provided with a small area which is sand blasted thus when each individual tube receives the sample of milk to be tested, a proper sign or number can be placed on the tube indicating the dairy from which the milk came. Thus, by means of the reductase test, a complete record may be made as to the point where the milk turns white, the time element indicating the bacteria count.

Other tests may be made with the present device. For example, some other mixture may be used instead of methylene blue which would indicate the presence of some other harmful bacteria that might be present in the milk.

When a lower or higher temperature is required for the reductase or other tests, all that is necessary is to make a simple adjustment provided for in all thermal switches. Thus, clearly, my device is simple, easily and safely operated.

Clearly many minor detail changes may be made without departing from the spirit and scope of the present invention as recited in the appended claims.

Having thus shown and described my invention, I claim:

1. Testing apparatus comprising a tank for a thermally sensitive liquid, motor means mounted within the upper portions of said tank, propeller means drivingly connected with said motor means and disposed medially in said tank in position for operation in a horizontal plane immersed in liquid in the tank so that, when the motor means is in operation, liquid may be circulated by the propeller means in said tank in all directions radially and downwardly of said propeller means, an electric heating element supported centrally in the lower portions of said tank adjacent said propeller means and in position to receive the direct flow therearound of liquid circulated by said propeller means, and a thermally responsive element disposed in said tank adjacent said heating element and propeller means for controlling the temperature of liquid in the tank.

2. Testing apparatus comprising a tank for a thermally sensitive liquid, a propeller disposed centrally within the tank in position for operation in a horizontal plane to circulate the liquid downwardly and outwardly in the tank, motor means mounted medially in the upper portions of the tank above the liquid and drivingly connected with said centrally disposed propeller for actuating the same, an electric heating element and a thermally controlled switch thereof, said switch and heating element being in heat exchange contact with said liquid for maintaining the liquid at a predetermined temperature, racks adapted to hold a plurality of test tubes, said racks being positioned in said tank on opposite sides of said propeller to dispose the contents of test tubes in the racks wholly below the normal level of the liquid in the tank, and removable cover means adapted to cover and shield the open ends of the tubes in the racks.

3. Testing apparatus comprising an elongated, relatively shallow tank for a thermally sensitive liquid, motor means mounted within the upper central portions of said tank, thereby affording zones within the tank on opposite sides of said motor means for the reception of test samples in position immersed in liquid in the lower portions of said tank, propeller means drivingly connected with said motor means and disposed medially in said tank in position to immerse in the liquid between said testing zones, said propeller means being mounted for operation in a horizontal plane so that, when the motor means is in operation, liquid may be circulated by the propeller means in said tank through said testing zones in all directions radially and downwardly of said propeller means, an electric heating element supported in said tank between said zones and adjacent said propeller means, and thermostatic means for controlling the delivery of energizing power to said heating element, said thermostatic means comprising a thermally responsive element disposed in said tank between said testing zones and adjacent said heating element and said propeller means, said heating element and said thermally responsive element being disposed in the path of liquid circulated in said tank by the action of said propeller means, whereby to maintain the circulating liquid at a substantially uniform temperature throughout the tank, including said testing zones.

4. Testing apparatus comprising a tank for a thermally sensitive liquid, motor means mounted within the upper portions of said tank, propeller means drivingly connected with said motor and disposed centrally in said tank, said propeller means being supported in position for operation in a horizontal plane immersed in the liquid so that, when the motor means is in operation, liquid may be circulated by the propeller means in said tank in all directions radially and downwardly of said propeller means, an electric heating element supported in said tank adjacent said propeller means, and thermostatic means for controlling the delivery of energizing power to said heating element, said thermostatic means comprising a thermally responsive element disposed in said tank adjacent said heating element and said propeller means, said heating element and said thermally responsive element being disposed in the path of liquid circulated in said tank by the action of said propeller means and said thermally responsive element being mounted sufficiently close to the heating element as to be directly affected thereby to cause operation of the thermostatic means under the influence of heat delivered thereto by convection through liquid circulated by the propeller means and by heat received by direct conduction through the liquid disposed between the heater means and the thermally responsive element.

5. Testing apparatus comprising an elongated, relatively shallow tank for a thermally sensitive liquid forming a testing bath, motor means mounted within the upper portions of said tank, propeller means drivingly connected with said motor and disposed centrally in said tank, said propeller means being supported in position for operation in a horizontal plane immersed in the liquid so that, when the motor means is in operation, liquid may be circulated by the propeller means in said tank in all directions radially and downwardly of said propeller means toward the bottom of the tank, an electric heating element supported in said tank adjacent said propeller means, and thermostatic means for controlling the delivery of energizing power to said heating element, said thermostatic means comprising a thermally responsive element disposed in said tank in heat exchange relationship with liquid circulated by said propeller means, said heating element and said thermally responsive element being disposed directly in the path of liquid circulated in said tank from said propeller means, whereby to maintain the circulating liquid at a substantially uniform temperature throughout the tank.

JOSEPH S. LOSEE.